(12) United States Patent
Ng et al.

(10) Patent No.: US 6,449,963 B1
(45) Date of Patent: Sep. 17, 2002

(54) AIRCRAFT AIR CONDITIONING SYSTEM AND METHOD

(75) Inventors: Casey Y. K. Ng, Issaquah; Warren Andrew Atkey, Bothell; Gregg Grant LaVoy, Kirkland; Leigh M. Sedgwick, Mercer Island, all of WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/023,738

(22) Filed: Dec. 19, 2001

Related U.S. Application Data

(62) Division of application No. 09/629,769, filed on Jul. 31, 2000.

(51) Int. Cl.$^7$ .............................. F25D 9/00; B24D 13/00
(52) U.S. Cl. ............................. 62/86; 62/402; 454/71; 454/74
(58) Field of Search ...................... 62/86, 402; 454/71, 454/74

(56) References Cited

U.S. PATENT DOCUMENTS

| | | |
|---|---|---|
| 2,582,848 A | 1/1952 | Price |
| 2,767,562 A | 10/1956 | Hall |
| 3,169,466 A | 2/1965 | Cramer |
| 3,187,768 A | 6/1965 | Waterfill |
| 3,208,234 A | 9/1965 | Messingner |
| 3,537,510 A | 11/1970 | Rannenberg et al. |
| 3,577,902 A | 5/1971 | Garnder |
| 4,014,179 A | 3/1977 | Iles et al. |
| 4,175,583 A | 11/1979 | Finkelstein et al. |
| 4,187,090 A | 2/1980 | Bizzarro et al. |
| 4,209,993 A | 7/1980 | Rannenberg |
| 4,301,833 A | 11/1981 | Donald, III |
| 4,399,665 A | 8/1983 | Evans et al. |
| 4,430,867 A | 2/1984 | Warner |
| 4,445,342 A | 5/1984 | Warner |
| 4,462,561 A | 7/1984 | Cronin |
| RE32,100 E | 4/1986 | Rannenberg |
| 4,681,610 A | 7/1987 | Warner |
| 4,993,886 A | 2/1991 | Hofstetter |
| 5,516,330 A | 5/1996 | Dechow et al. |
| 5,545,084 A | 8/1996 | Fischer et al. |
| 5,704,218 A | 1/1998 | Christians et al. |

*Primary Examiner*—Ronald Capossela
(74) *Attorney, Agent, or Firm*—Alston & Bird LLP

(57) ABSTRACT

An air conditioning system and method are provided for use in an aircraft having a pressurized area and an unpressurized area. The air conditioning system includes an air conditioning pack located in the unpressurized area of the aircraft that conditions fresh air. The air conditioning system also includes a first air duct for directing a flow of recirculation air from the pressurized area, through a pressure bulkhead, and into the unpressurized area. A mixer is also provided and advantageously positioned in the unpressurized area for mixing the conditioned air from the air conditioning pack and the recirculation air from the pressurized area. Advantageously, the mixer obviates the need for a mix manifold and saves valuable space for passengers, cargo, and other aircraft equipment. The air conditioning system also includes a second air duct that directs the mixture of conditioned air and recirculation air from the mixer to the pressurized area of the aircraft. The air conditioning unit also includes an aerodynamic shutoff valve in line with the first air duct at the pressure bulkhead and adapted for protecting against depressurization of the pressurized area as a result of the depressurization of the first air duct.

4 Claims, 2 Drawing Sheets

AIRCRAFT AIR CONDITIONING SYSTEM AND METHOD

CROSS-REFERENCE TO RELATED APPLICATIONS

This application is a divisional of U.S. application Ser. No. 09/629,769, filed Jul. 31, 2000, which is hereby incorporated herein in its entirety by reference.

FIELD OF THE INVENTION

The present invention relates to an aircraft air conditioning system and method, and more particularly to an apparatus and method for controlling the climate in the passenger cabin of an aircraft enclosure.

BACKGROUND OF THE INVENTION

For many years the provision of air conditioning systems, as well as heating systems, has been known and advanced in the aircraft industry. In particular, it is known to supply a relatively constant flow of fresh air into the pressurized body of commercial aircraft both on the ground and in the air for ventilating the passenger cabin, the cockpit, and other pressurized regions within the aircraft. In order to maintain a relatively constant and comfortable temperature and humidity level of the ventilation air for the passengers and crew in the aircraft, recirculation air from the cabin area of the aircraft typically is mixed with fresh air.

Conventional air conditioning systems for commercial aircraft often use open loop systems to provide a mixture of fresh air and recirculated air into the pressurized compartment. An example of a conventional aircraft air conditioning system is shown in FIG. 1. According to FIG. 1, the conventional air conditioning system 10 comprises several components, most of which are located in the pressurized compartment 40 of the aircraft. In operation, fresh air is provided by fresh air treatment hardware, such as air conditioning packs 30, located in the unpressurized area 50 of the aircraft. The recirculation air 12 from the pressurized compartment 40, such as the passenger cabin, cockpit, and selected cargo areas, is first processed through a filter 14 and then delivered by fans 16 to be mixed with the fresh air from the packs 30 prior to distribution to the pressurized compartments.

In conventional high cooling capacity systems 10, the mixing of sub-freezing fresh air and recirculated cabin air 12 occurs in a large mix manifold 20 located in the pressurized compartment 40, which thereby disadvantageously reduces the amount of available pressurized space in the aircraft. In large aircraft, the mix manifold 20 and associated ducting may take up to about 400 ft$^3$. The mix manifold 20 is also used to remove entrained moisture, such as ice particles or water droplets, from the air mixture and to prevent ice from propagating into the passenger cabin or crew areas via air distribution ducting 22. Conventional air conditioning systems also include a check valve 34 in line with the pack conditioned air supply lines 32 and 36 that delivers the fresh air from the packs to the mix manifold 20. The check valve 34 protects against depressurization of the pressurized compartment due to a rupture in the pack conditioned air duct 32 in the unpressurized area 50.

Some smaller commuter-type aircraft include a mix manifold in the unpressurized area proximate to the air conditioning packs. However, cabin depressurization is not a concern with these types of aircraft because they typically operate at low altitudes. Therefore, check valves and/or shutoff valves in the conditioned air supply line and distribution ducting are not required.

The air conditioning packs 30 that provide cold fresh air often carry ice suspended in the air stream, particularly when the aircraft operates at hot, humid, and low altitudes. Conventional methods of air mixing in the mix manifold 20 unfortunately allow the ice particles to combine into larger particles. As such, it may be relatively difficult to melt the ice prior to its introduction into the air distribution ducting 22. This often results in or contributes to several known problems, such as clogging of the distribution ducting, noise, and a condition known as "snow in the plane," wherein ice particles are distributed through the distribution ducting 22 and into the passenger cabin or crew areas. Several systems have been developed to address these problems. One such system provides a recirculation heat exchanger unit downstream of the mix manifold to melt any ice suspended in the air stream. The system also includes an ice sensor adapted for controlling a valve and directing a flow of warm air into the air steam to melt any ice suspended therein.

However conventional aircraft air conditioning systems, including those mentioned above, continue to suffer from several disadvantages. In particular, conventional air conditioning systems occupy pressurized space, which could otherwise be used for passengers or cargo. In addition, conventional air conditioning systems typically include a mix manifold, which adds to the weight of the aircraft, contributes to the noise level in the passenger compartment, and requires extensive development testing. It would be desirable, therefore, to provide an aircraft air conditioning system that is lighter and quieter and that does not occupy as much space within the pressurized compartment of the aircraft.

SUMMARY OF THE INVENTION

These and other needs are provided, according to the present invention, by an aircraft air conditioning system and method that is highly efficient, lightweight, and designed to directly mix recirculated cabin air with fresh air without requiring a mix manifold in the pressurized compartment of an aircraft. As such, the present invention is particularly advantageous for large, commercial type airplanes. It should be noted, however, that the air conditioning system of the present invention is not limited to airplanes. Regardless of the type of aircraft, the air conditioning system and method is designed to reduce the noise level in the passenger cabin while also freeing up more room in the pressurized area for passengers, cargo, or equipment.

According to the present invention, the air conditioning system and method are adapted for use in an aircraft having a pressurized area and an unpressurized area separated by a pressure bulkhead. The air conditioning system includes one or more conventional air conditioning packs located in the unpressurized area of the aircraft, such as an underwing area.

The air conditioning system also includes a first air duct that extends between the pressurized area and the unpressurized area of the aircraft. The first air duct directs a flow of recirculation air from the pressurized area, such as a passenger cabin area and/or cargo areas, to the unpressurized area through the pressure bulkhead. In one embodiment, a fan is disposed in fluid communication with the first air duct to assist in directing the flow of recirculation air.

The air conditioning system also includes a mixer, operatively positioned in the unpressurized area downstream of the air conditioning pack, for mixing the conditioned air from the air conditioning pack and the recirculation air from the pressurized area. The mixer combines the two air flows into a resultant air mixture such that any ice present in the conditioned air is melted. Advantageously, the relatively small and efficient mixer of the present invention obviates the need for a mix manifold and saves valuable space for passengers, cargo and/or other aircraft equipment within the pressurized area. In addition, placement of the mixer in the unpressurized area can also reduce the noise in the passenger compartment relative to conventional designs.

The air conditioning system also includes a second air duct connected to the mixer that directs the resultant air mixture from the mixer back to the pressurized area of the aircraft. To protect against depressurization of the pressurized area, a check valve, such as a flapper valve or the like, is provided between the pressurized and unpressurized areas at the pressure bulkhead. A plurality of scuppers are provided in the second air duct for removing moisture from the resultant air mixture as the mixture travels through the second air duct. Advantageously, the mixer is designed to swirl the resultant air mixture, which allows the moisture in the resultant air mixture to condense into water droplets and be collected by the scuppers in the second air duct before the mixture is distributed into the pressurized area, thus substantially reducing the possibility of liquid or ice particles in the mixture. Moreover, since the water is condensed at the outlet of the air conditioning pack, more second air duct length is available to collect the water via the scuppers.

The air conditioning system also includes an aerodynamic shutoff valve in line with the first air duct at the pressure bulkhead and also adapted for protecting against depressurization of the pressurized area. More specifically, the aerodynamic shutoff valve provides protection of the pressurized area in the event of a duct rupture in the unpressurized area, yet allows the recirculation air to travel from the pressurized area to the unpressurized area. As discussed more fully below, the aerodynamic shutoff valve permits air to pass from the pressurized area to the unpressurized area under normal conditions, but closes when a predetermined pressure differential across the shutoff valve is exceeded. Thus, the pressurization of the passenger compartment is protected even as air is passed to and from the unpressurized area in order to be properly mixed.

A method of air conditioning an aircraft enclosure is now provided. The method includes providing a flow of recirculation air from the pressurized area to the unpressurized area, and then mixing the recirculation air with a flow of cooling air to form a resultant air mixture. The cooling air may contain suspended ice particles, but by mixing the cooling air with the warmer recirculation air, the suspended ice particles are melted or substantially eliminated into water droplets and collected within the second air duct that returns the resultant air mixture to the pressurized area. In this regard, the second air duct is adapted for removing moisture from the resultant air mixture, such as by including scuppers, and is operably connected to the pressurized area via a check valve, such as a flapper valve. As such, the resultant air mixture substantially reduces or eliminates small fog or ice droplets suspended in the air flow supplied to the passenger cabin area, cargo areas, and other pressurized areas.

Advantageously, the mixing occurs in the unpressurized area of the aircraft and without the use of a mix manifold. By doing so, the present invention provides an aircraft air conditioning system and method having less weight, less noise, and a more effective means of moisture removal, yet providing ease of maintenance. In addition, the passengers and crew of the aircraft enjoy a quieter flight because the mixer resides outside of the pressurized area. Moreover, locating the mixer of the present invention in the unpressurized area of the aircraft results in a larger percentage of the pressurized area that can be used for revenue production, such as passenger seating or cargo.

DETAILED DESCRIPTION OF THE PRESENT INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather,these embodiments are provided so that this disclosure will be thorough and complete, and will fully convey the scope of the invention to those skilled in the art. Like numbers refer to like elements throughout.

Figure 2:
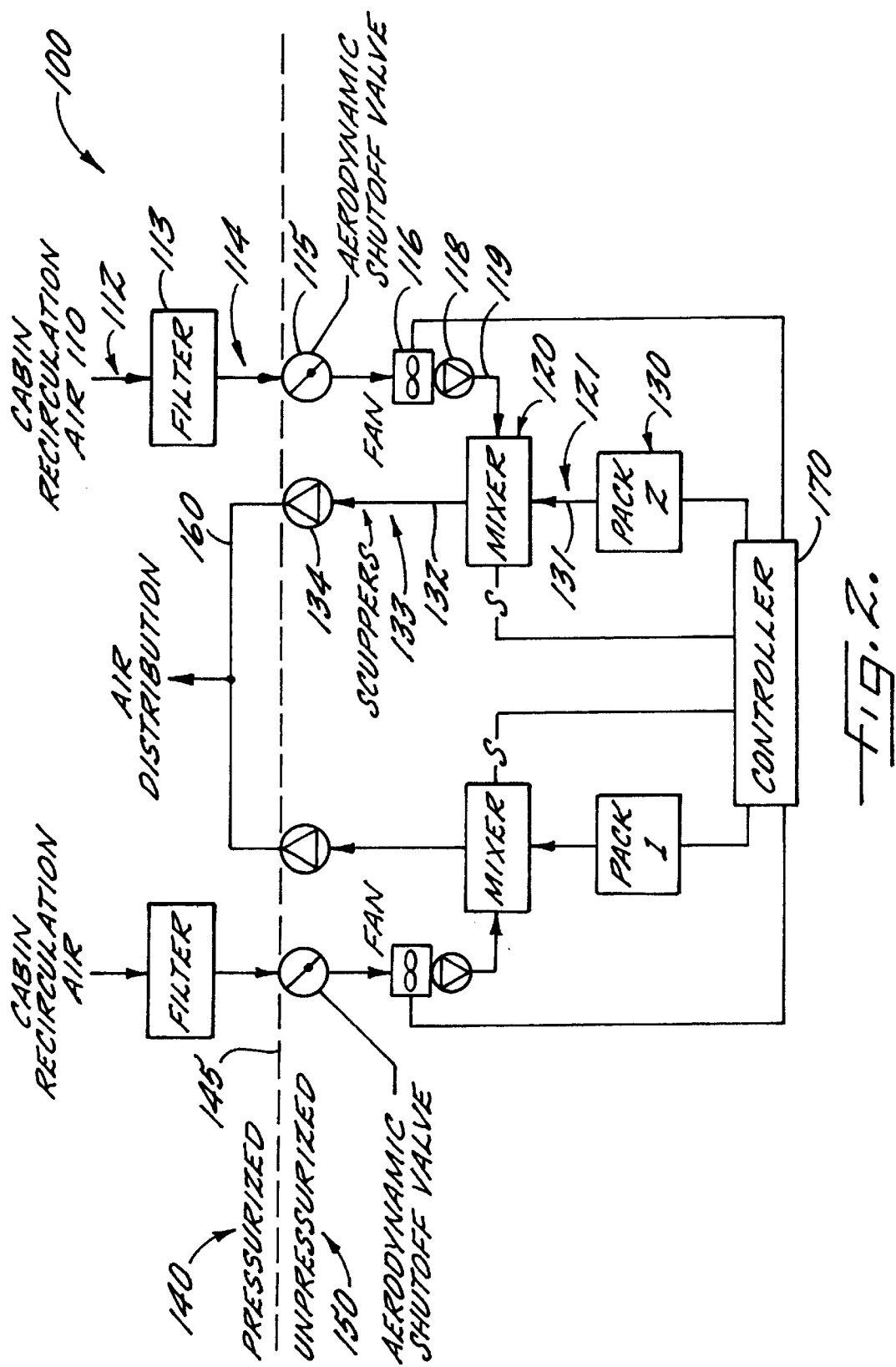
FIG. 2 is a schematic diagram of an aircraft air conditioning system according to the present invention.

Turning to FIG. 2, there is shown a schematic view of an air conditioning system 100 in accordance with the present invention. As shown, the air conditioning system 100 is particularly advantageous for use in commercial airplanes that operate at high altitudes. However, the air conditioning system can have other forms and be used in other applications, such as in other types of aircraft, without departing from the spirit and scope of the present invention. In addition, the system 100 is capable of equally efficient use during both high altitude cruising flight and on the ground. For ease of explanation, each like component will be designated with a singular reference number. However, the system 100 may include more than one component. For example, the embodiment of FIG. 2 includes two of substantially all the components.

FIG. 2 illustrates the system 100 as used in an aircraft having a pressurized area 140 and an unpressurized area 150 and defining a pressure bulkhead 145 therebetween. Although the system 100 is shown as a singular unit, the system may be designed such that separate systems are provided for individual zones within the pressurized area 140. As such, separate temperatures may be maintained for each zone to ensure comfort and efficiency.

According to the present invention, recirculation air 110 is drawn from the pressurized area 140, such as a passenger cabin, cockpit, or cargo area, into a collecting duct 112. In this regard, a fan 116 is generally disposed in fluid communication with the collecting duct 112 to draw air from the pressurized area 140. In one embodiment, the fan 116 is located inside the pressurized area 140, but, more preferably, the fan is located in the unpressurized area 150 to allow easier maintenance access and to reduce fan noise transmission to the passenger cabin or other locations inside the pressurized area. The recirculation air 110 typically has a relatively high moisture content and a raised temperature. In one embodiment, the recirculation air 110 is filtered through a filter 113 disposed within the collecting duct. The filter removes particles, such as odor components and disease carriers, e.g. viruses, germs, bacteria, and other contaminants, from the recirculation air 110. In one embodiment, the system 100 also includes carbon dioxide strippers (not shown) disposed within the collecting duct 112. The filtered recirculation air is then routed through a transfer duct 114 across the pressure bulkhead 145 and through an aerodynamic shutoff valve 115.

The aerodynamic shutoff valve 115 is located in the unpressurized area 150 proximate the pressure bulkhead 145 and adapted for protecting against decompression of the pressurized area 140 due to pressure loss downstream of the shutoff valve 115 in the unpressurized area. In one advantageous embodiment, the shutoff valve 115 comprises a mechanical butterfly valve having an offset shaft and a spring-loaded flapper. The flapper is spring-loaded to be set at a fully open position during normal operation and aerodynamically loaded in a fully closed position at a preset pressure differential across the flapper. Other types of similar valves, such as an aerodynamic shutoff valve with an electrical override actuator, can also be used. Thus, the shutoff valve 115 permits a flow of recirculation air 112 to pass through the shutoff valve, but as the flow increases and the pressure differential across the flapper increases the flapper will become loaded such that the shutoff valve 115 will be fully closed when the preset pressure differential across the flapper is reached. After passing through the shutoff valve 115, the recirculation air 110 is delivered to a relatively small mixer 120 via a check valve 118 and delivery duct 119.

The system 100 also includes an air conditioning pack 130 for properly conditioning fresh air 121. Air may be provided to the air conditioning pack 130 from various sources. In one embodiment, for example, the source of air (not shown) for the air conditioning pack may be the compressor of a gas turbine engine, or an auxiliary power unit, such that relatively high temperature, high pressure air is supplied to the air conditioning pack for treatment. In one embodiment, the pack 130 is traditionally a combination of heat exchangers, compressors, and turbines that are known in the art, although other types of air conditioning packs can be employed. The pack 130 provides the fresh air 121 to the mixer 120 via a transfer duct 131 for mixing with the recirculation air 110. Alternatively, the pack 130 can be directly connected to the mixer 120. In order to maintain pressure equilibrium, the volume of fresh air provided by the pack 130 is substantially equal to a volume of leakage air (not shown) that is removed to the environment outside the aircraft. Thus, leakage air is constantly replenished in the pressurized area 140. Further, in order to minimize the required amount of fresh air 121, the recirculation air 110 is mixed with the fresh air 121.

Advantageously, the mixer 120 is located in the unpressurized area 150 of the aircraft proximate the air conditioning pack 130. In particular, the mixer 120 is disposed between the delivery duct 119 and the transfer duct 131 and is adapted for mixing the relatively warm, moist recirculation air 110 and the cold, fresh air 121 from the air conditioning pack 130. The mixer 120 obviates the need for a large mix manifold and associated ducting present in conventional systems and reduces weight and noise. The mix manifold and the associated ducting present in conventional systems can occupy up to a volume of about 400 ft$^3$, whereas the present invention occupies about one third of the volume occupied by conventional systems. Moreover, locating the mixer 120 in the unpressurized area 150, such as a portion of a pack bay 111, allows easy maintenance access.

The air quality is monitored and controlled by a control unit 170. Although the control unit 170 is depicted to be in the unpressurized area 150, the control unit may be in the pressurized area 140, if so desired. A sensor S is operatively connected to the mixer 120 and adapted for detecting conditions such temperature. The control unit 170 is operatively connected with and controls the pack 130 and fan 116 to maintain air flow in the pressurized area 140 according to a desired temperature setting therein, taking into account the conditions detected by sensor S.

The control unit 170 generates appropriate control signals, whereby the status of the system 100 is constantly monitored and correspondingly controlled when the system is in operation. Accordingly, the control unit 170 effectively maintains desired conditions through appropriate control signals to the pack 130 and/or fan 116.

As known in the art for operating in a humid environment, the air conditioning pack 130 often cools the fresh air 121 such that ice particles become suspended therein, which is disadvantageous if left unaddressed. The air conditioning system and method of the present invention address this problem by mixing the recirculation air 110 with the fresh air 121 at the mixer 120, which is located proximate the air conditioning pack 130 at which the ice particles suspended in the fresh air 121 have minimal size. The mixer 120 mixes the two air flows 110, 121 to produce a resultant air flow 133 having a temperature that is sufficiently high such that the ice particles are substantially eliminated. More specifically, ice particles suspended in the fresh air 121 are melted and condensed into tiny water droplets, which are then collected in downstream ducting 132 prior to entering air distribution ducts 160.

Figure 1:
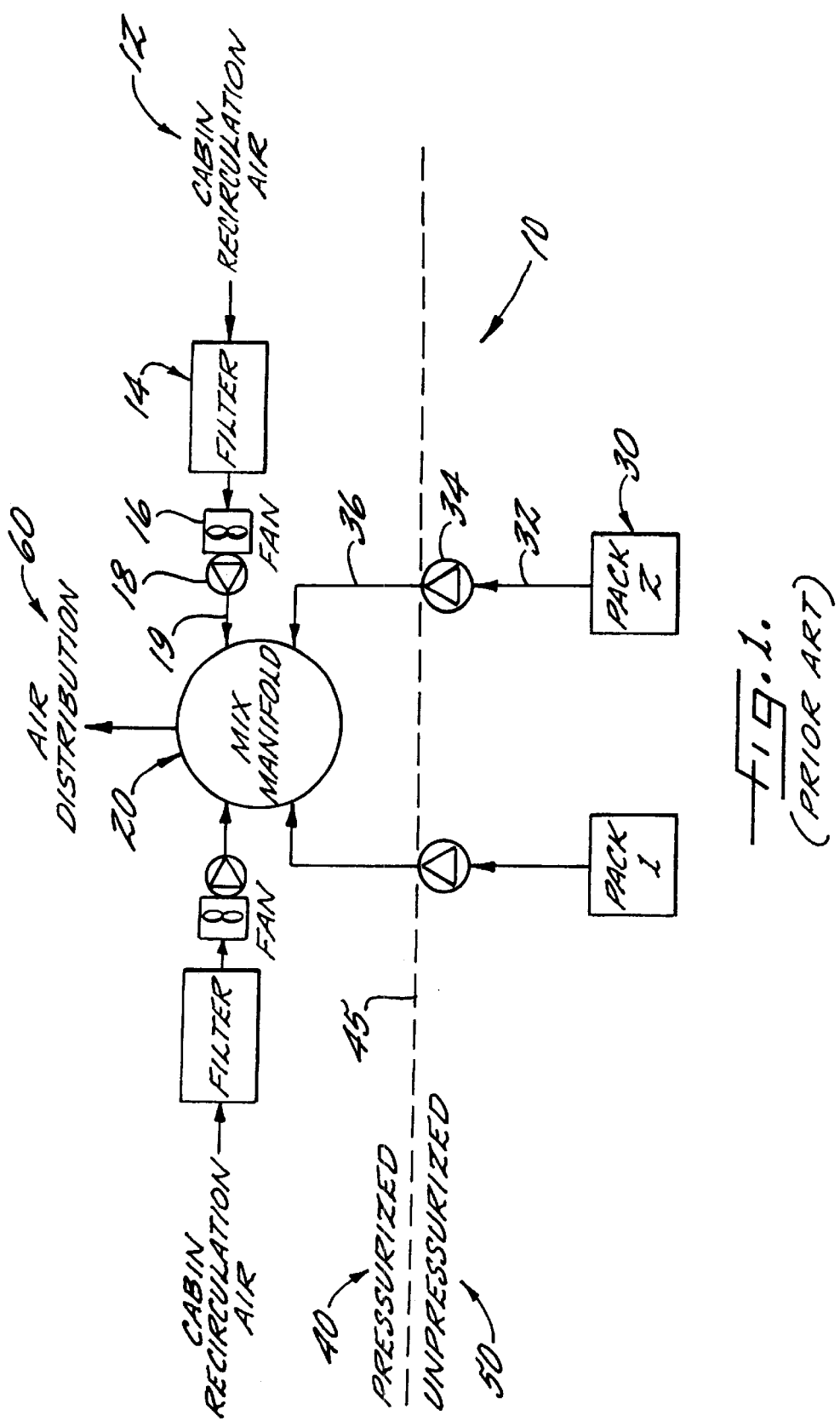
FIG. 1 is a schematic diagram of a conventional aircraft air conditioning system.

Advantageously, the mixer 120 is designed to swirl the resultant air flow 133 such that the tiny water droplets combine into larger droplets, which are then removed with conventional scuppers and discharged through drainage duct 135. More specifically, the downstream ducting 132 is extended a relatively longer distance than the ducting, if any, of the conventional system 10 (See FIG. 1). By lengthening the downstream duct 132 after the mixer 120, the present system 100 advantageously obviates the need for a heat exchanger or other device to melt ice particles and provides an improved collection area that allows the tiny water droplets suspended in the resultant air flow 133 to combine into larger droplets as the resultant air flow travels through the downstream duct 132. The droplets are then collected by the scuppers which are operatively connected to the drainage duct 135, where the droplets are discharged from the aircraft. However, the droplets may also be used for other purposes, such as to enhance heat exchanger cooling.

The resultant air flow 133 passes through the pressure bulkhead 145 via a check valve 134 and into the air distribution ducts 160. In one embodiment, the check valve 134 is a mechanical flapper check valve. The check valve 134 protects against depressurization of the pressurized area 140 due to a duct rupture or the like in the unpressurized area 150.

A method of air conditioning an aircraft enclosure is also provided. In particular, the method comprises providing a flow of recirculation air 110 from the pressurized area 140 to the unpressurized area 150 through a first air duct comprising one or more of the collecting duct 112, transfer duct 114, and delivery duct 119. The pressurized area is protected from depressurization by passing the flow of recirculation air 110 through a valve, such as the aerodynamic shutoff valve 115. The flow of recirculation air 110 is then mixed with a flow of cooling air, namely the fresh air 121 from the air conditioning pack 130, so that the resultant air mixture 133 is formed having a temperature such that ice particles are melted or substantially eliminated.

Advantageously, the mixing step is performed in the unpressurized area 150 of the aircraft without a conventional mix manifold. As described in detail above, mixing in this manner creates more pressurized area 140 that can be used for passengers, cargo or equipment. In addition, placing the mixer 120 in the unpressurized area 150 reduces noise in the passenger compartment and improves ease of maintenance. Other advantages are also realized, such as less weight. After mixing, the resultant air mixture 133 is passed through a second air duct comprising the downstream ducting 132 and air distribution duct 160. As described above, the downstream ducting 132 is sized and adapted for removing moisture, such as water droplets, from the resultant air mixture 133. The resultant air mixture 133 is then supplied to the pressurized area 140 through the air distribution duct 160 so as to maintain in the pressurized area, including the passenger compartment, at the desired temperature without generating a fog, snow, or water in the aircraft.

From the foregoing it will be seen that there has been shown and described an aircraft air conditioning system and method that provide several advantages. The use of the system and method eliminates the need for reserving a large space in the pressurized area for a conventional mix manifold. The space can thus be used for revenue cargo, passengers, and/or other equipment installations. Other benefits include better management of ice from the air conditioning pack and downstream ducting, improved water removal from the resultant air mixture using lightweight scuppers in the downstream ducting and noise improvement by isolating the mixer and associated fan components further from the passenger cabin. While particular embodiments of the invention have been shown and described, it will be understood that the invention is not limited thereto since modifications may be made by those skilled in the art, particularly in light of the foregoing teachings. It is therefore contemplated by the following claims to cover any such modifications and incorporate those features which constitute the essential features of these improvements within the spirit and scope of the invention.

What is claimed is:

1. A method of air conditioning a pressurized area of an aircraft, the aircraft having a pressure bulkhead between the pressurized area and an unpressurized area of the aircraft, the method comprising:

providing a flow of recirculation air from the pressurized area to the unpressurized area;

protecting against depressurization of the pressurized area;

mixing the flow of recirculation air directly with a flow of cooling air so that a resultant air mixture is formed having a temperature such that ice particles are substantially eliminated, said mixing performed in the unpressurized area of the aircraft;

passing the resultant air mixture through an air duct for delivery to the pressurized area of the aircraft; and removing moisture from the resultant air mixture while passing through the air duct prior to delivery to the pressurized area of the aircraft.

2. A method according to claim 1, wherein protecting against depressurization of the pressurized area includes passing the flow of recirculation air from the pressurized area to the unpressurized area through an aerodynamic shutoff valve.

3. A method according to claim 1, further comprising filtering the flow of recirculation air before mixing the flow of recirculation air.

4. A method according to claim 1, wherein passing the resultant air mixture includes passing the resultant air mixture through an air duct having a plurality of scuppers adapted for removing water droplets from the resultant air mixture.

* * * * *